(12) United States Patent
Frolov

(10) Patent No.: US 10,882,125 B2
(45) Date of Patent: Jan. 5, 2021

(54) BLADE SIZE LIMITER

(71) Applicant: Robert Bosch GmbH, Stuttgart (DE)

(72) Inventor: Andrew Frolov, Glenview, IL (US)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 16/092,109

(22) PCT Filed: Apr. 10, 2017

(86) PCT No.: PCT/US2017/026800
§ 371 (c)(1),
(2) Date: Oct. 8, 2018

(87) PCT Pub. No.: WO2017/177226
PCT Pub. Date: Oct. 12, 2017

(65) Prior Publication Data
US 2019/0160565 A1 May 30, 2019

Related U.S. Application Data

(60) Provisional application No. 62/320,323, filed on Apr. 8, 2016.

(51) Int. Cl.
*B23D 47/04* (2006.01)
*B23D 47/00* (2006.01)
*B27G 19/00* (2006.01)
(Continued)

(52) U.S. Cl.
CPC ............ *B23D 47/04* (2013.01); *B23D 47/00* (2013.01); *B27G 19/00* (2013.01); *B27G 19/02* (2013.01); *B23D 47/12* (2013.01)

(58) Field of Classification Search
CPC ........ B23D 47/12; B23D 47/04; B23D 47/00; B27G 19/02; B27G 19/00
See application file for complete search history.

(56) References Cited

U.S. PATENT DOCUMENTS

2002/0017182 A1    2/2002  Gass et al.
2005/0188806 A1*   9/2005  Garcia ................ B23D 45/067
                                                            83/471.3
(Continued)

FOREIGN PATENT DOCUMENTS

CN    201030588 Y    3/2008
CN    101758563 A    6/2010
(Continued)

OTHER PUBLICATIONS

International Search Report dated Jun. 27, 2017 for PCT/US2017/026800 filed Apr. 10, 2017.
(Continued)

*Primary Examiner* — Ghassem Alie
*Assistant Examiner* — Fernando A Ayala
(74) *Attorney, Agent, or Firm* — Norton Rose Fulbright US LLP; Gerard Messina

(57) ABSTRACT

A power tool includes a motor; an arbor attachment mechanism that includes a shaft configured to be driven by the motor about a spin axis. The arbor attachment mechanism is configured to hold a blade onto the shaft. The power tool includes a blade size limiter that is configured to prevent attachment of a blade with a radius greater than a predetermined size, and is configured to be connected to the arbor attachment mechanism independently of the attachment of the blade to the arbor attachment mechanism and such that the blade size limiter is at a distance from the spin axis of the shaft.

25 Claims, 19 Drawing Sheets

(51) Int. Cl.
*B27G 19/02* (2006.01)
*B23D 47/12* (2006.01)

(56) References Cited

U.S. PATENT DOCUMENTS

| | | | | |
|---|---|---|---|---|
| 2007/0113715 A1* | 5/2007 | Burke | ............... | B23D 47/04 |
| | | | | 83/102.1 |
| 2007/0186739 A1* | 8/2007 | Peot | ............... | B27G 19/08 |
| | | | | 83/102.1 |
| 2007/0277661 A1* | 12/2007 | Domeny | ............... | B27G 19/02 |
| | | | | 83/477.2 |
| 2011/0017037 A1* | 1/2011 | Xu | ............... | B27B 5/243 |
| | | | | 83/102.1 |
| 2011/0061506 A1* | 3/2011 | Frolov | ............... | B27G 19/02 |
| | | | | 83/102.1 |
| 2016/0067880 A1* | 3/2016 | Frolov | ............... | B27G 19/02 |
| | | | | 83/102.1 |

FOREIGN PATENT DOCUMENTS

| | | |
|---|---|---|
| CN | 201758563 A | 6/2010 |
| CN | 102079782 A | 5/2013 |
| CN | 103079782 A | 5/2013 |
| CN | 205043247 U | 2/2016 |

OTHER PUBLICATIONS

National Intellectual Property Administration, P. R. China Search Report dated Nov. 18, 2019 for Chinese Application No. 201780035629.1 filed Apr. 1, 2017.

\* cited by examiner

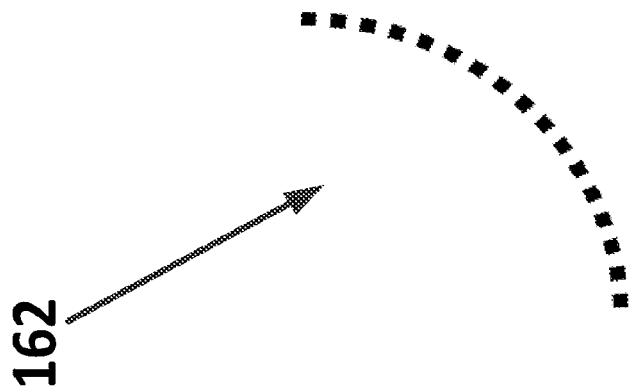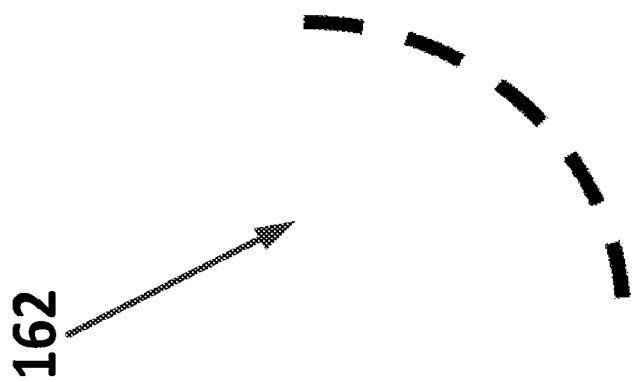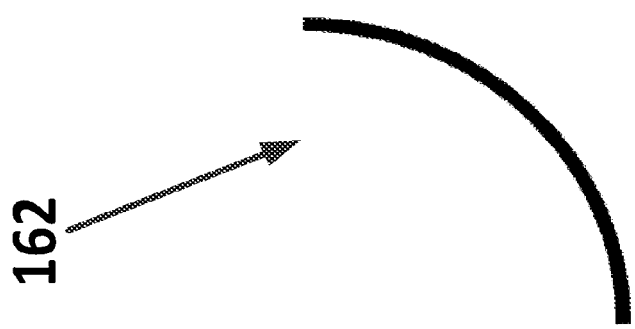
FIG. 17

BLADE SIZE LIMITER

CROSS-REFERENCE TO RELATED APPLICATION

The present application is the National Stage of International Patent Application Serial No. PCT/US2017/026800, filed Apr. 10, 2017, which claims the benefit under 35 U.S.C. § 119(e) of U.S. Provisional Patent Application Ser. No. 62/320,323, filed Apr. 8, 2016, the content each of which are hereby incorporated herein by reference in their entireties.

FIELD OF THE INVENTION

The present invention relates to power tools and particularly to those, such as power table saws, that are integrated into tables that provide work surfaces for supporting workpieces.

BACKGROUND

A number of power tools have been produced to facilitate forming a workpiece into a desired shape. One such power tool is a table saw. A wide range of table saws are available for a variety of uses. Some table saws, such a cabinet table saws, are very heavy and relatively immobile. Other table saws, sometimes referred to as jobsite table saws, are relatively light and portable so that a worker can position the table saw at a jobsite. Some accuracy is typically sacrificed in making a table saw sufficiently light to be mobile. The convenience of locating a table saw at a jobsite, however, makes jobsite table saws very desirable in applications such as general construction projects.

All table saws, including cabinet table saws and jobsite table saws, present a safety concern because the saw blade of the table saw is sharp and moving at a high rate of speed. Accordingly, severe injury such as severed digits and deep lacerations can occur almost instantaneously. A number of different safety systems have been developed for table saws in response to the dangers inherent in an exposed blade moving at high speed. One such safety system is a blade guard. Blade guards movably enclose the saw blade, thereby providing a physical barrier that must be moved before the rotating blade is exposed. While blade guards are effective to prevent some injuries, the blade guards can be removed by an operator either for convenience of using the table saw or because the blade guard is not compatible for use with a particular shaped device. By way of example, a blade guard is typically not compatible with a dado blade and must typically be removed when performing non-through cuts.

Other safety components include riving knives and splitters that are positioned behind the blade and are intended to keep a workpiece from binding on the teeth at the rear side of the blade, which can lead to kickback. Also, pawls with teeth that dig into a workpiece if it should start to kickback may be employed. All these features may be attached to table saw in various manners and are sometimes fixed relative to the table of the table saw and are other times movable with respect to the table.

In cases where safety components and their associated mounting hardware are movable with respect to table, a saw blade may be attached to a saw arbor attachment assembly and may not initially interfere with the safety components, their mounting structure, or other parts of the table saw, but movement of these safety components closer to the saw blade can create an interference that causes damage to the safety mechanism, the saw blade, or other parts of the table saw. This occurs because the table saw is designed to only accommodate a saw blade of a maximum diameter to maintain a minimum clearance between the saw blade and the safety components and other components of the table saw. If a blade that is too big is installed, this clearance may be eliminated leading to a crash of the saw blade and another component.

Similarly, in cases where safety components and their associated mounting hardware are fixed with respect to the table, movement of the saw arbor assembly may draw the blade toward the safety components or other parts of the table saw until it crashes into them if too big a blade has been installed.

Similarly, in cases where the safety components are movable with respect to the saw arbor attachment assembly and the blade, i.e., the safety components may be moved until clearance between the safety components and the saw blade is eliminated if the blade is bigger than what was initially planned for that design of table saw, this elimination of clearance can lead to a crash of the saw blade and another component.

In some table saws, a throat plate is removable for adjusting the position of a riving knife. Similarly, a lever is movable for releasing the holding mechanism that positions the riving knife. In some cases, either the throat plate or the lever of the holding mechanism may be returned into their normal operating positions and, when a blade that is too big is installed, may be located between the teeth of, and interfere with, the saw blade, and similar situations may occur with other table saw components. Once the saw is turned on, a crash may therefore happen.

SUMMARY

In view of the foregoing, it is desirable to provide a table saw that prevents an unintentional between the saw blade and safety components, their associated mounting hardware, or other components of the table saw.

A summary of certain example embodiments is set forth below. It should be understood that these aspects are presented merely to provide the reader with a brief summary of these certain embodiments and that these aspects are not intended to limit the scope of the present invention. Indeed, this invention can encompass a variety of aspects that may not be set forth below.

Example embodiments of the present invention include those related to an apparatus that includes a power tool, the power tool including a motor and an arbor attachment assembly that includes a shaft that is driven by the motor and that defines a spin axis. The arbor attachment assembly is configured to hold a blade onto the shaft. The power tool further includes a blade size limiter that is configured to prevent the attachment of a blade that has too great a radius, is configured to be operatively connected to the arbor attachment assembly separately from a blade that is attached to the arbor attachment assembly, and is configured to maintain a predetermined distance from the spin axis of the shaft to the blade size limiter after the blade size limiter has been attached to the arbor attachment assembly.

Other embodiments include a blade size limiter that includes an extension portion that includes an arcuate segment and mounting structure that is separate from the extension portion and spaced away from the extension portion.

These and other features, aspects, and advantages of the present invention will become better understood when the following detailed description of certain exemplary embodiments is read with reference to the accompanying drawings in which like characters represent like parts throughout the drawings.

BRIEF DESCRIPTION OF THE DRAWINGS

FIG. 17 depicts various profiles that the extension portion of the blade size limiter can take, according to example embodiments of the present invention.

DETAILED DESCRIPTION

One or more specific example embodiments will be described below. In an effort to provide a concise description of these embodiments, not all features of an actual implementation are described in the specification. In the development of any such actual implementation, as in any engineering or design project, numerous implementation-specific decisions can be made to achieve the developers' specific goals, such as compliance with system-related and business-related constraints, which may vary from one implementation to another. Moreover, such development effort would be a routine undertaking of design, fabrication, and manufacture for those of ordinary skill having the benefit of this disclosure.

Figure 1:
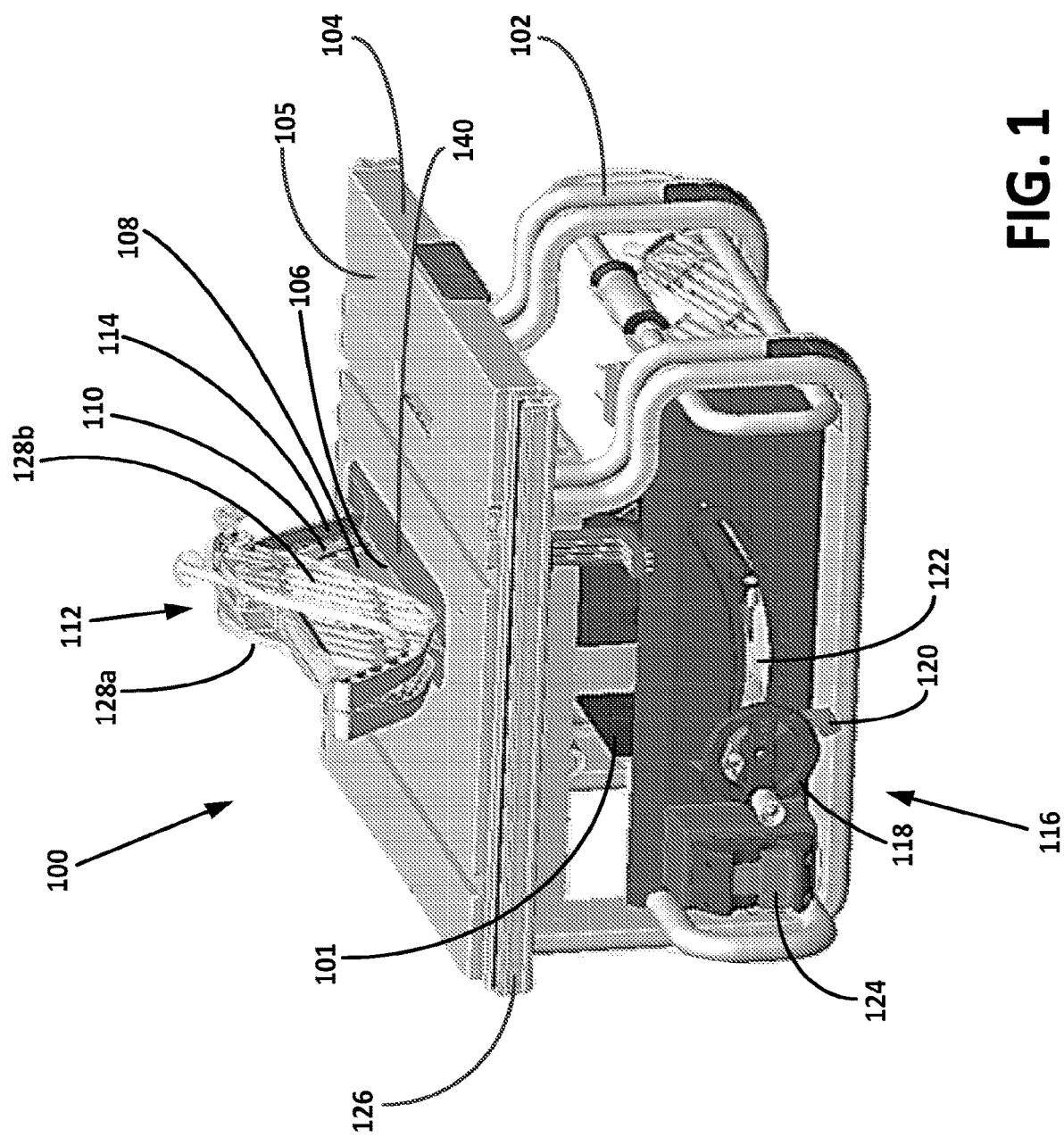
FIG. 1 is a perspective view of a table saw according to a first example embodiment of the present invention.

FIG. 1 shows a power tool, and particularly a table saw 100, according to an example embodiment of the present invention. The table saw 100 includes a base 102 that is configured to support a work surface and is further configured to enclose and contain working components of the saw, such as a conventional motor 101 and drive system (not shown clearly here). The base 102 can be configured for portability or can be a cabinet base that is kept in a generally fixed location. The base 102 supports a table 104 with a working surface 105 on which a workpiece can be supported for a cutting/shaping operation. The table 104 defines a blade slot 106 for receiving a rotary saw blade 108. A riving knife 110 is supported above the saw blade 108, and a blade guard 112 as well as anti-kickback pawls 114 can be pivotably mounted to the riving knife 110. The riving knife 110, anti-kickback pawls 114, and blade guard 112 are conventional safety components to reduce the likelihood of injury to the tool operator and to help prevent the operator from moving his/her hands into the saw blade.

FIG. 1 also shows a saw blade position adjustment mechanism 116 that allows the saw blade 108 to be raised and lowered relative to the table 104 or to be angled in slot 106 and relative to a vertical plane. In particular, rotating the wheel 118 raises or lowers the blade 108, and unlocking a lever 120 allows the saw blade attachment arbor assembly (not shown in this figure) to swing back and forth in a slot 122, creating an angle between the saw blade 108 and the vertical plane. An on/off switch 124 is also depicted as well as a guide rail 126 for receiving a fence (not shown).

Figure 2:
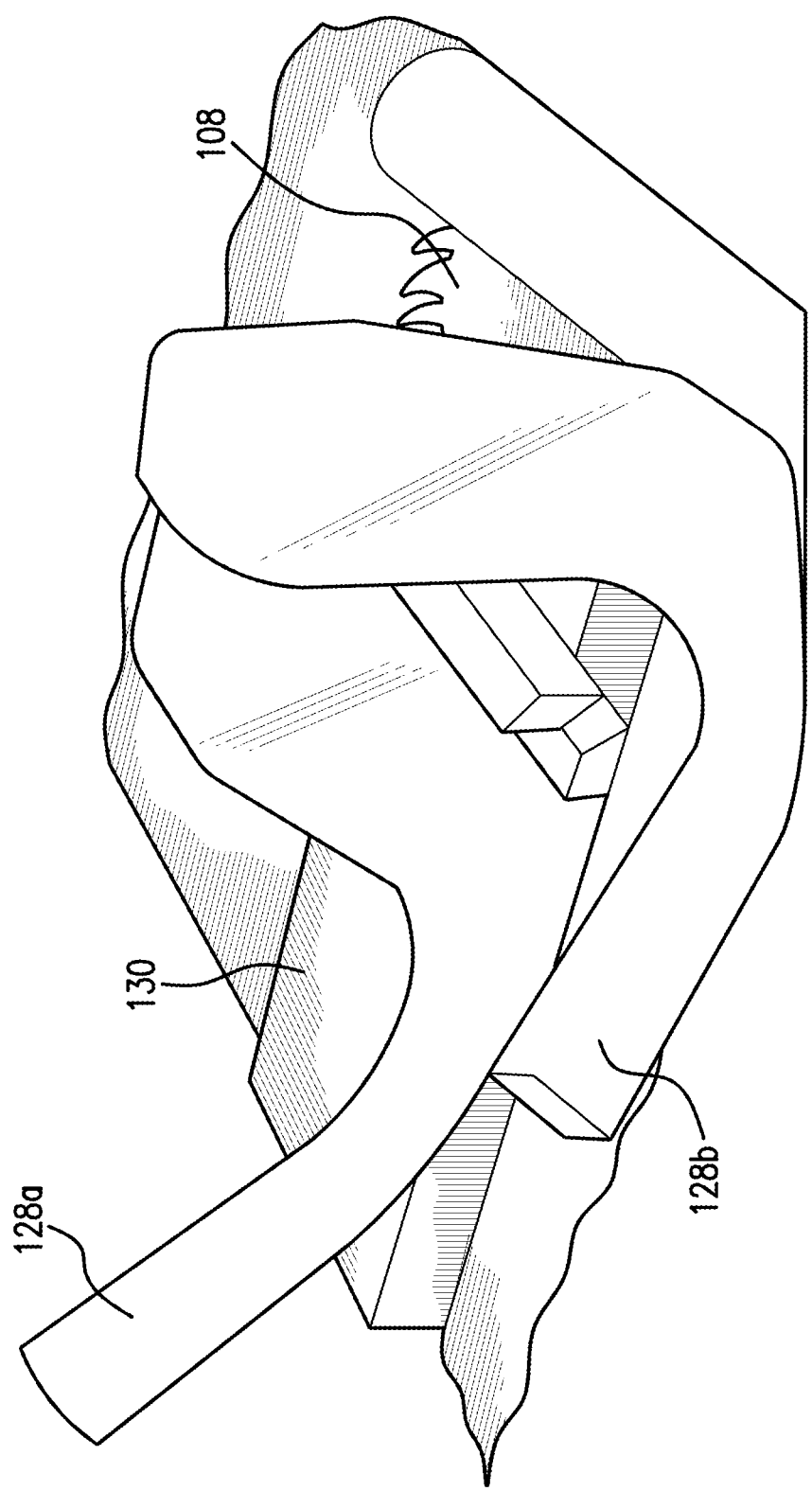
FIG. 2 is a close up view of blade guards of the table saw of FIG. 1, according to an example embodiment of the present invention, that shows the blade guards in greater detail and illustrates their flexibility when a beveled cut is being made on a workpiece.

FIG. 2 shows that the blade guard 112 can comprise two independently hinged side guards 128a-b, which can provide considerable more coverage than a solid blade guard during bevel cuts, by allowing one side to cover the blade 108 even while the other side is raised or riding over a workpiece 130. This design can offer similar advantages when cutting a thick workpiece, even for non-beveled cuts.

The blade guard 112 and the anti-kickback pawls 114 can be attached to the riving knife 110, as will be described in more detail below.

Figure 3:
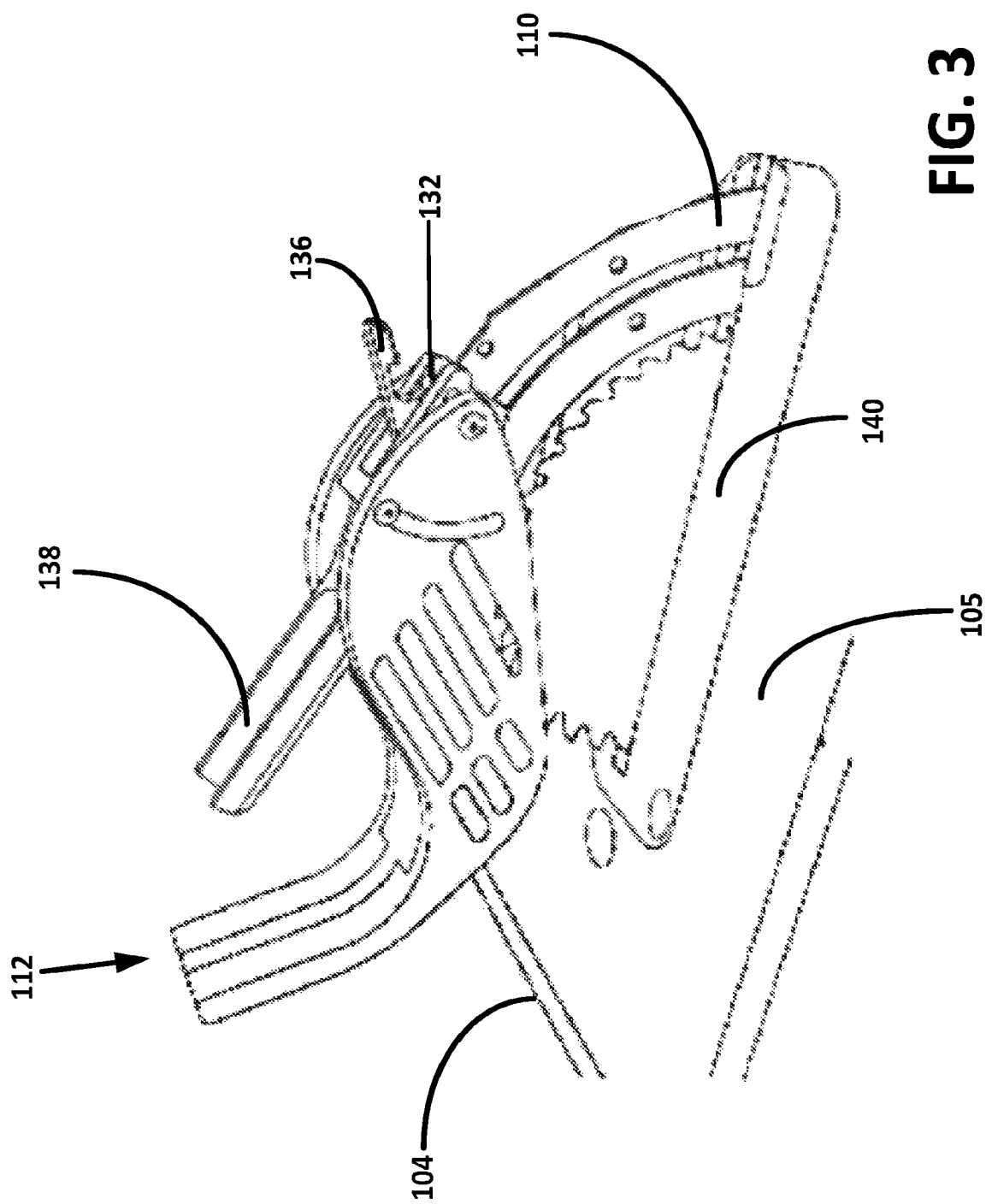
FIG. 3 illustrates an example position of components for attaching and detaching the blade guards of FIG. 2 to the table saw.

FIG. 3 shows how the blade guard 112 is attached to the riving knife 110. In an example embodiment, attaching the blade guard 112 to the riving knife 110 requires the user to tilt and lower the blade guard 112 onto an attachment point so that a cross bar 132 of the blade guard 112 hooks into a rear notch 134 (best seen in FIG. 4) of the riving knife 110 while simultaneously holding a guard release lever 136 up (see FIG. 3) with the other hand. The user then lowers a metal fork 138 (sometimes referred to as a tuning fork) of the blade guard 112 so that the fork 138 is parallel to the table 104 and presses on the guard release lever 136 to lock the blade guard 112 in place.

Figure 4:
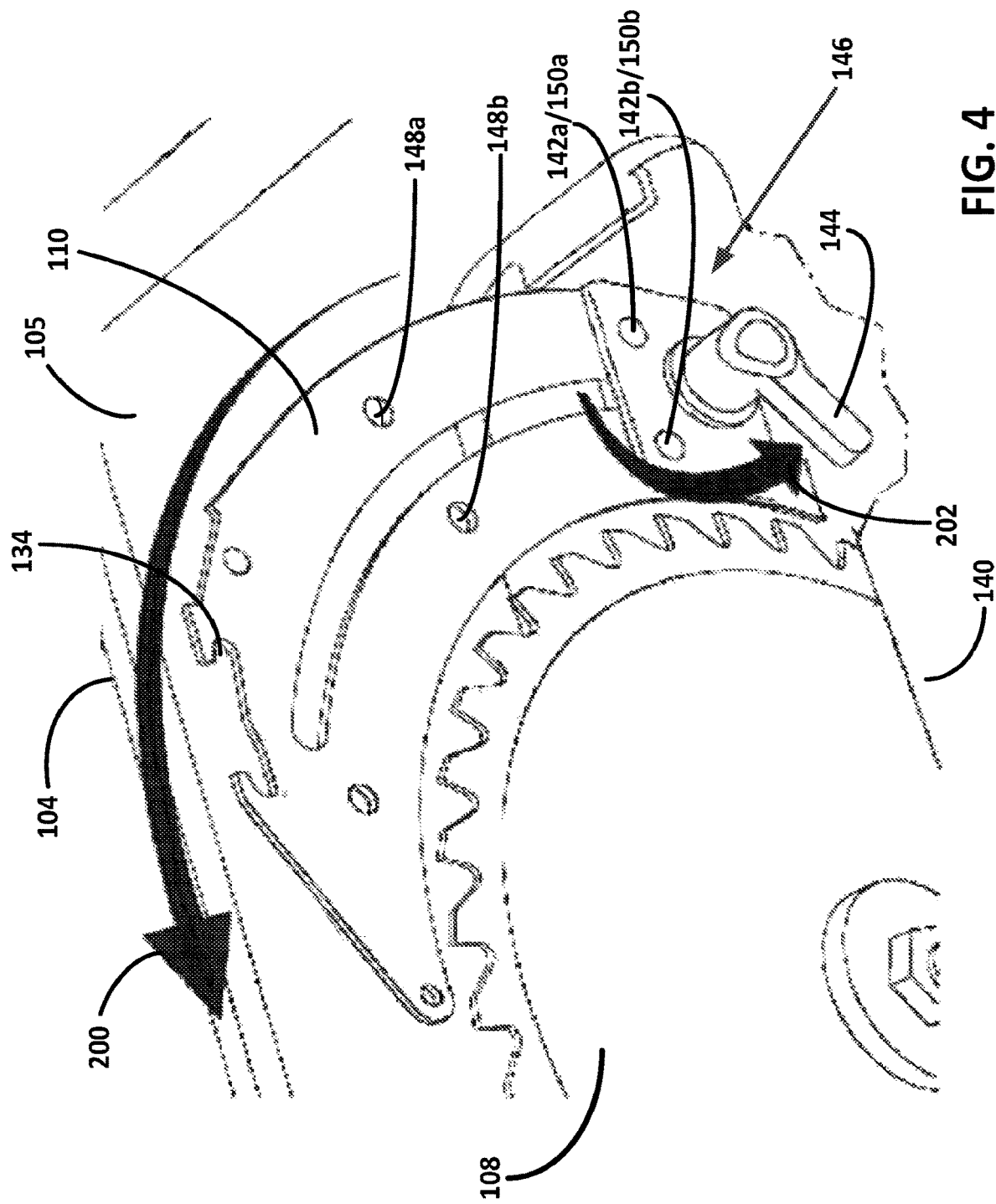
FIG. 4 depicts how a riving blade of the table saw of FIG. 1 can be elevated or lowered relative to an arbor assembly, according to an example embodiment of the present invention.
Figure 5:
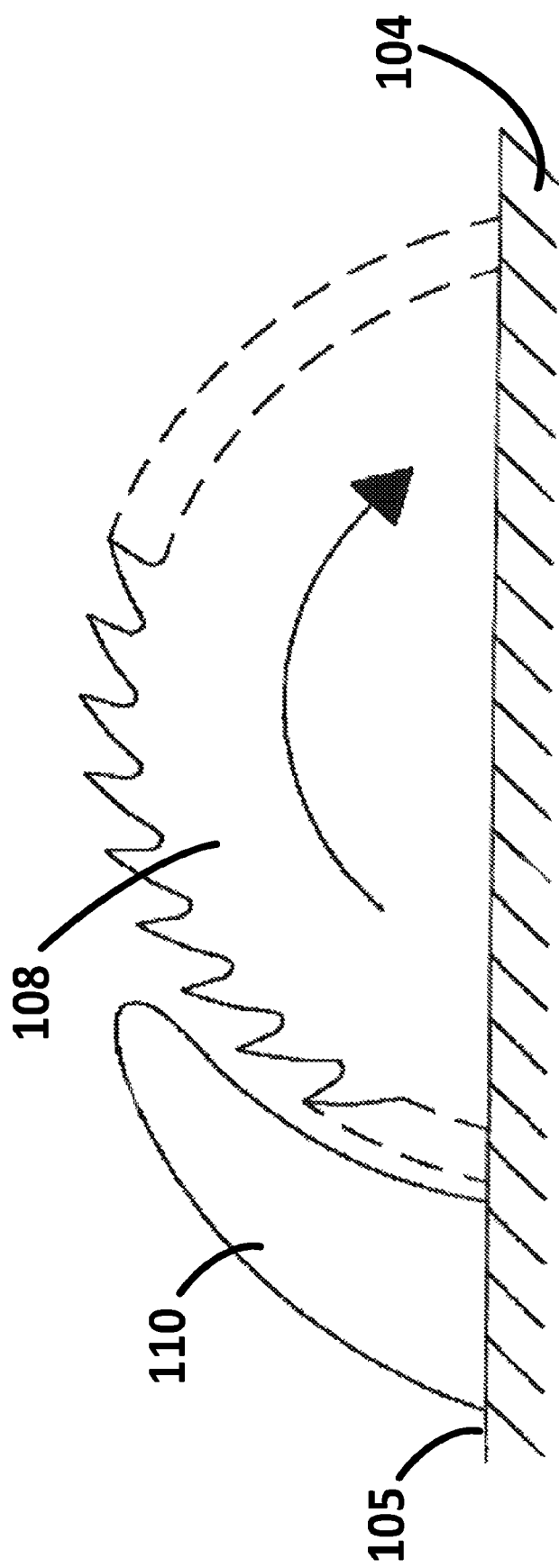
FIG. 5 is a right side sectional view of the table saw of FIG. 1 with only the riving knife and blade shown, with the riving knife in a middle vertical position relative to the table, according to an example embodiment of the present invention.

Turning to FIG. 4, in an example embodiment, the riving knife 110 locks into position using a riving knife position adjustment mechanism 146 located at the base of the riving knife 110, which includes locking pins 142a-b and a release lever 144. In an example embodiment, in order to adjust a position of the riving knife 110, the user first removes the throat plate 140, raises the blade 108 as high as possible, and sets the blade perpendicular to the table 104; and, subsequently, the user rotates the release lever 144 to an open position, e.g., in direction 202, and slides the riving knife 110 toward the lever 144 to disengage the riving knife 110 from the locking pins 142a-b. The user can then raise the riving knife 110 to its highest position, e.g., in direction 200, align its locking holes 150a-b with the locking pins 142a-b in the position adjustment mechanism 146, and rotate the release lever 144 back to lock the riving knife 110 into place. Once the riving knife 110 is in place, the throat plate 140 can be replaced. A similar process can be used to position the riving knife 110 in the lower position by selecting a higher set of locking holes, e.g., locking holes 148a-b. FIG. 5 depicts the riving knife 110 in its lowest position, where, according to an example embodiment, the blade guard 112 and anti-kickback pawls 114 are either unnecessary or unable to be attached and used.

Figure 6:
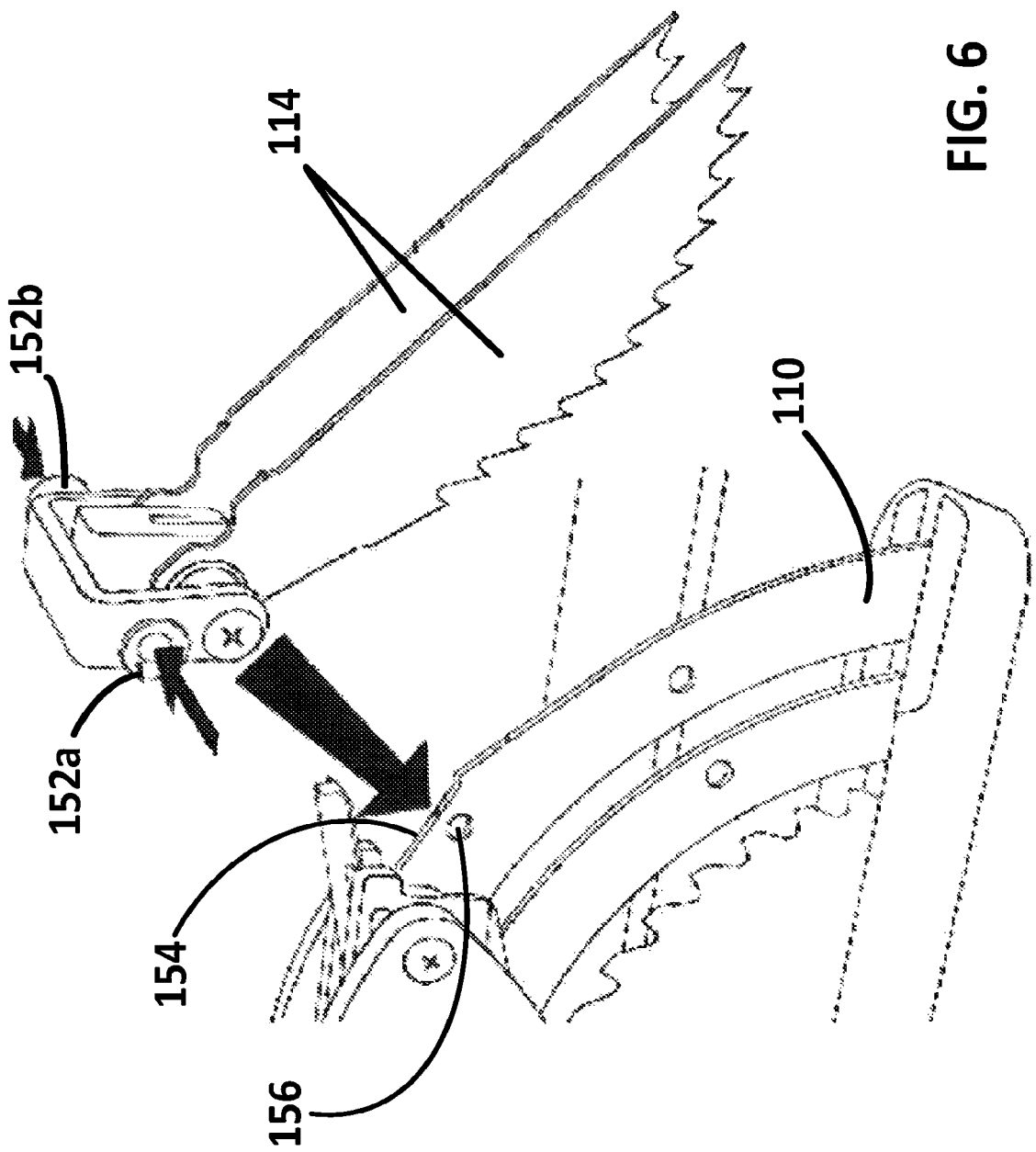
FIG. 6 depicts an attachment of anti-kickback pawls to the riving knife, according to an example embodiment of the present invention.

FIG. 6 shows that the anti-kickback pawls 114 can be attached to the riving knife 110 as part of an assembly with a locking pin (not shown) that can be opened or closed using a pair of opposing compression pads 152a-b on the pawls 114. To properly install the pawls 114, the consumer squeezes the compression pads 152a-b while nesting the pawls 114 onto a flat recessed portion 154 of the riving knife 110 so that the locking pin aligns with the riving knife's locking hole 156. Releasing the compression pads 152a-b engages or moves the locking pin into the locking hole 156 and locks the pawls 114 into place.

Figure 7:
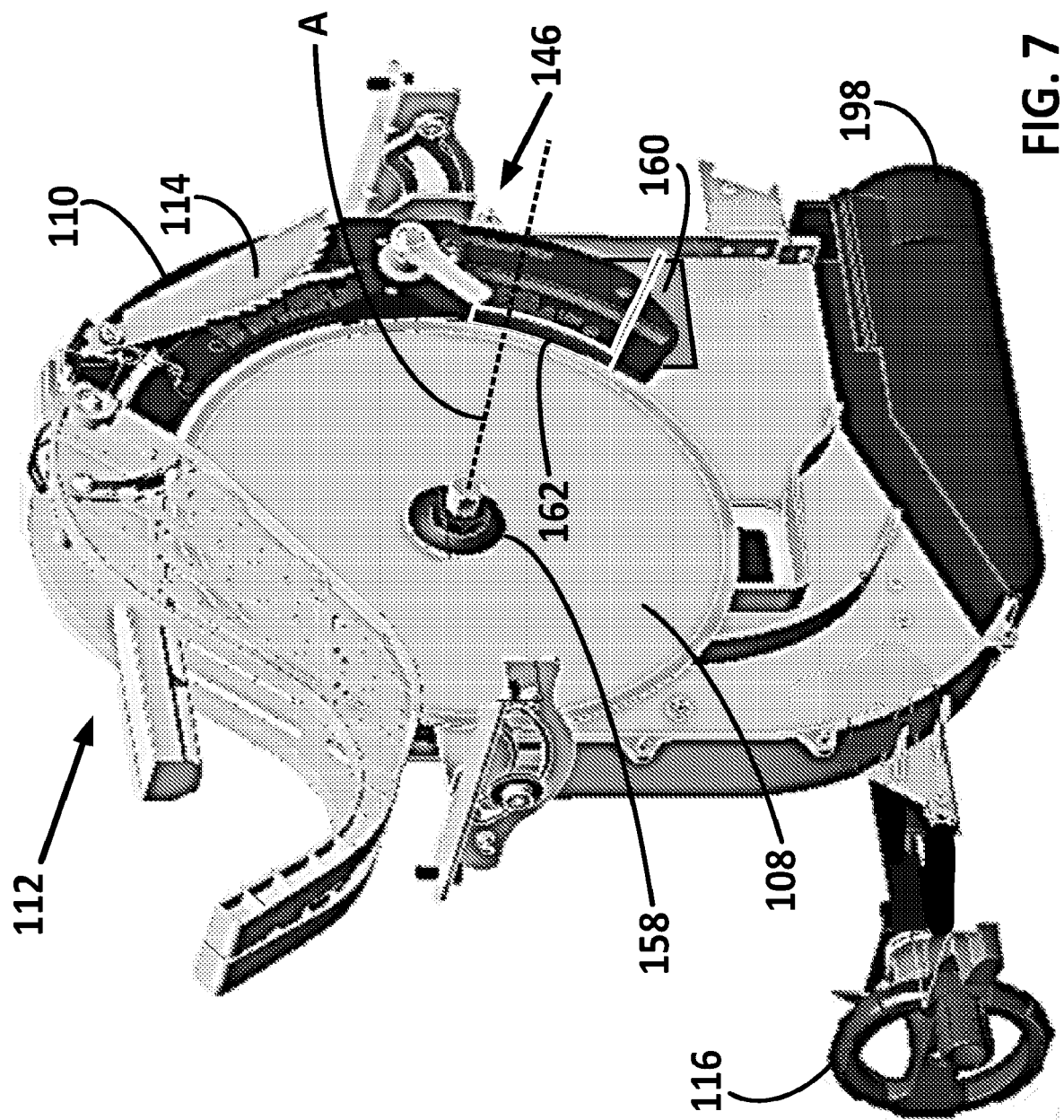
FIG. 7 is a perspective view of various parts of a table saw including a saw arbor attachment assembly, a saw blade position adjustment mechanism, and a first example embodiment of a blade size limiter, all removed from other parts of the table saw for enhanced clarity.

FIG. 7 is a perspective view of various parts of a table saw including a saw arbor attachment assembly 158 or mechanism, a saw blade position adjustment mechanism 116 as previously described, safety components, such as the blade guard 112, pawls 114, and riving knife 110 and their associated hardware, and a first example embodiment of a blade size limiter 160, all removed from other parts of the table saw for enhanced clarity. For this embodiment, the blade size limiter 160 is located below the table work surface 105 (not shown in this figure) and is proximate to the riving knife position adjustment mechanism 146 and the lower extremity of the river knife 110. The limiter 160 includes an extension portion 162 that is positioned between (a) blade 108 (shown here without the blade teeth so it can represent other work tools) and (b) the riving knife 110 and it position adjustment mechanism 146. Also, the extension portion 162 of the limiter 160 extends with a curvature about the spin axis A, and is located away from the spin axis A, beyond an outer edge of the blade 108. The limiter 160 prevents the insertion of a blade that has a larger diameter than that defined by the curved extension of the limiter 160 relative to the spin axis A, meaning that a user would not be able to insert such a saw blade all the way onto the arbor. This will be discussed in more detail below. In an example embodiment, the blade size limiter 160 is made of a soft material, such as plastic or aluminum, to prevent injuries in case the limiter 160 comes in contact with a moving blade.

Figure 8:
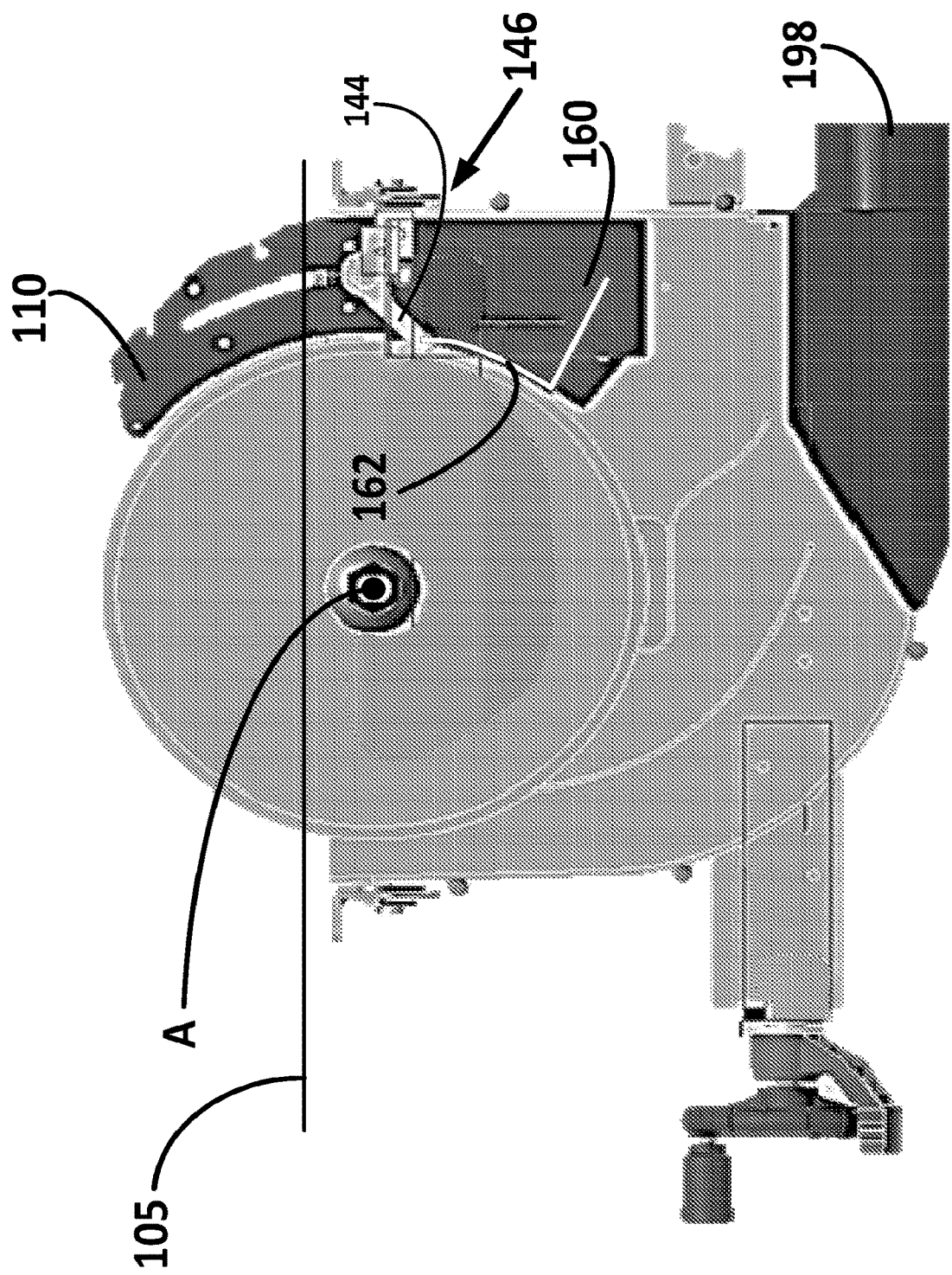
FIG. 8 is a right side view of the table saw of FIG. 7 with the blade guards, tuning fork and pawls removed, according to an example embodiment of the present invention.

FIG. 8 depicts more clearly the relative position of the extension portion 162 of the limiter 160 to the work tool or blade 108, riving knife position adjustment mechanism 146, release lever 144 of mechanism 146, work surface 105 of the table 104, and riving knife 110 in a plane that is parallel to that of the spinning blade 108 or that is perpendicular to the spin axis A of the blade 108.

Figure 9:
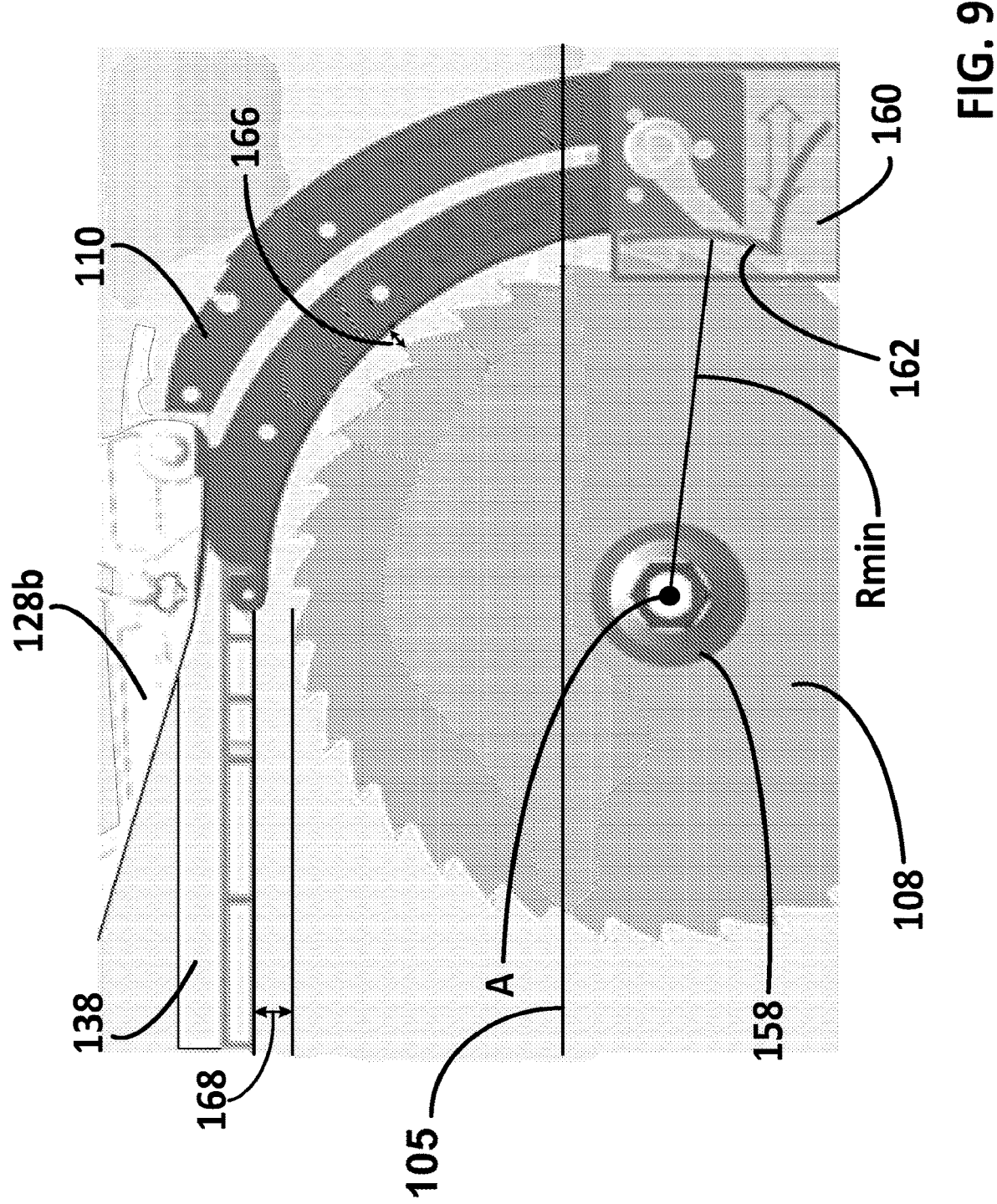
FIG. 9 is a right side view of a table saw according to an example embodiment of the present invention that shows an example of how a blade size limiter helps to maintain proper clearance between a tuning fork and the saw blade and between the riving knife and the saw blade.

FIG. 9 shows that, when the extension portion 162 of the blade size limiter 160 is present, the possibility of the blade 108 crashing into the riving knife 110 and fork 138 of the blade guard 112 is minimized. More specifically, a first clearance 166 will be maintained between the riving knife 110 and the blade 108. Similarly, a second clearance 168 will also be maintained between the fork 138 and the blade 108. (The side guards 128a-b of the blade guard 112 are free to rotate as previously mentioned, are shown in FIG. 9 to be rotated up and out of the way, and are therefore of little concern as a hard crash of the blade guard 112 with the blade 108 is unlikely.)

In an example embodiment, the limiter 160 is operatively associated with the arbor attachment assembly 158 so that the relative position of the limiter 160 to the attachment assembly 158 and the spin axis A of the blade remains fixed as the blade 108 and the attachment assembly 158 are moved. Consequently, any blade attempted to be installed onto the arbor must not exceed a radius established by the minimum distance from the spin axis A to the nearest portion of the extension 162 of the limiter 160. This $R_{min}$ distance (see FIG. 9) does not change significantly, no matter how the relative positions of the riving knife 110 or blade 108 are changed. For this embodiment, the entire extension portion 162 maintains this $R_{min}$ distance relative to the spin axis A, i.e., the extension portion 162 has a consistent radial shape that forms an arc having a radius of $R_{min}$ relative to the spin axis A. Further details of this operative association between the extension portion 162 of the limiter 160, the arbor attachment assembly 158 and arbor spin axis A are described below. In an alternative example embodiment, the limiter 160 is adjustable toward and away from the spin axis A. For example, in an example embodiment, the limiter 160 is attached to the riving knife 110, but is not coupled to the arbor attachment assembly 158.

Figure 10:
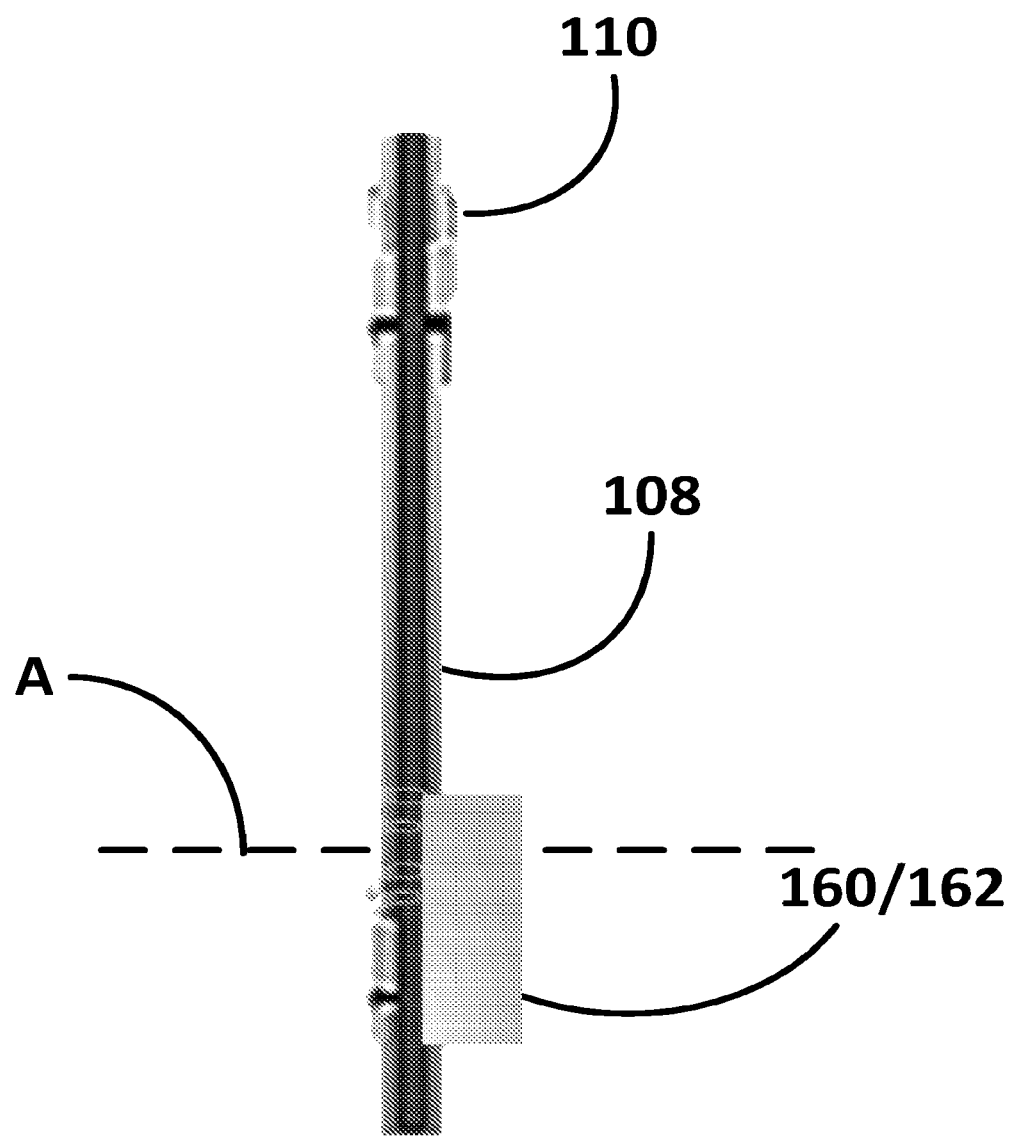
FIG. 10 is a front view of the table saw of FIG. 9, illustrating the relative position of the riving knife to the saw blade as well as the extension of the saw blade size limiter, according to an example embodiment of the present invention.

FIG. 10 provides a front view of the blade 108 and illustrates its alignment with the riving knife 110, as well as the amount the extension portion 162 of the blade size limiter 160 extends past the blade 108 along the spin axis A of the blade. The extension portion 162 of the blade size limiter 160 prevents installation of a blade with too large a diameter on the arbor attachment assembly 158 by interference of the extension portion 162 with the radial extremity of the blade 108, e.g., the extension portion 162 prevents positioning of the blade 108 to line up the bore of the blade 108 with a threaded portion of a shaft on which the blade 108 is to be installed. It is helpful if a width and/or position of the extension portion 162 of the blade size limiter 160 is such that the extension portion 162 extends laterally beyond a side face of the blade and, preferably, in an example embodiment, the extension portion 162 extends past the threaded portion of the shaft.

Figure 11:
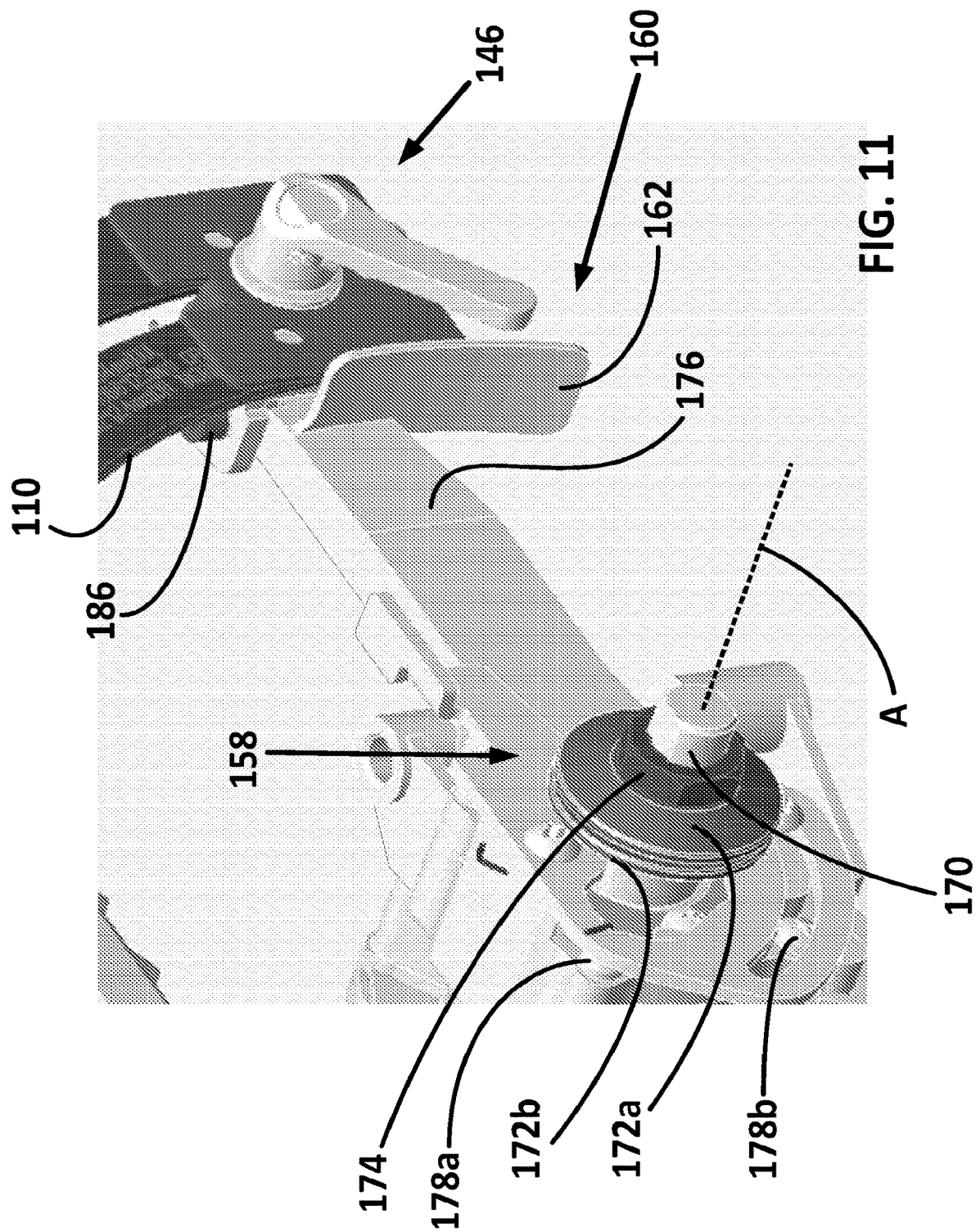
FIG. 11 is a close up perspective view of an arm into which a saw blade size limiter is integrated and that connects a saw blade attachment mechanism to the riving knife via a riving knife position adjustment mechanism, according to an example embodiment of the present invention.
Figure 12:
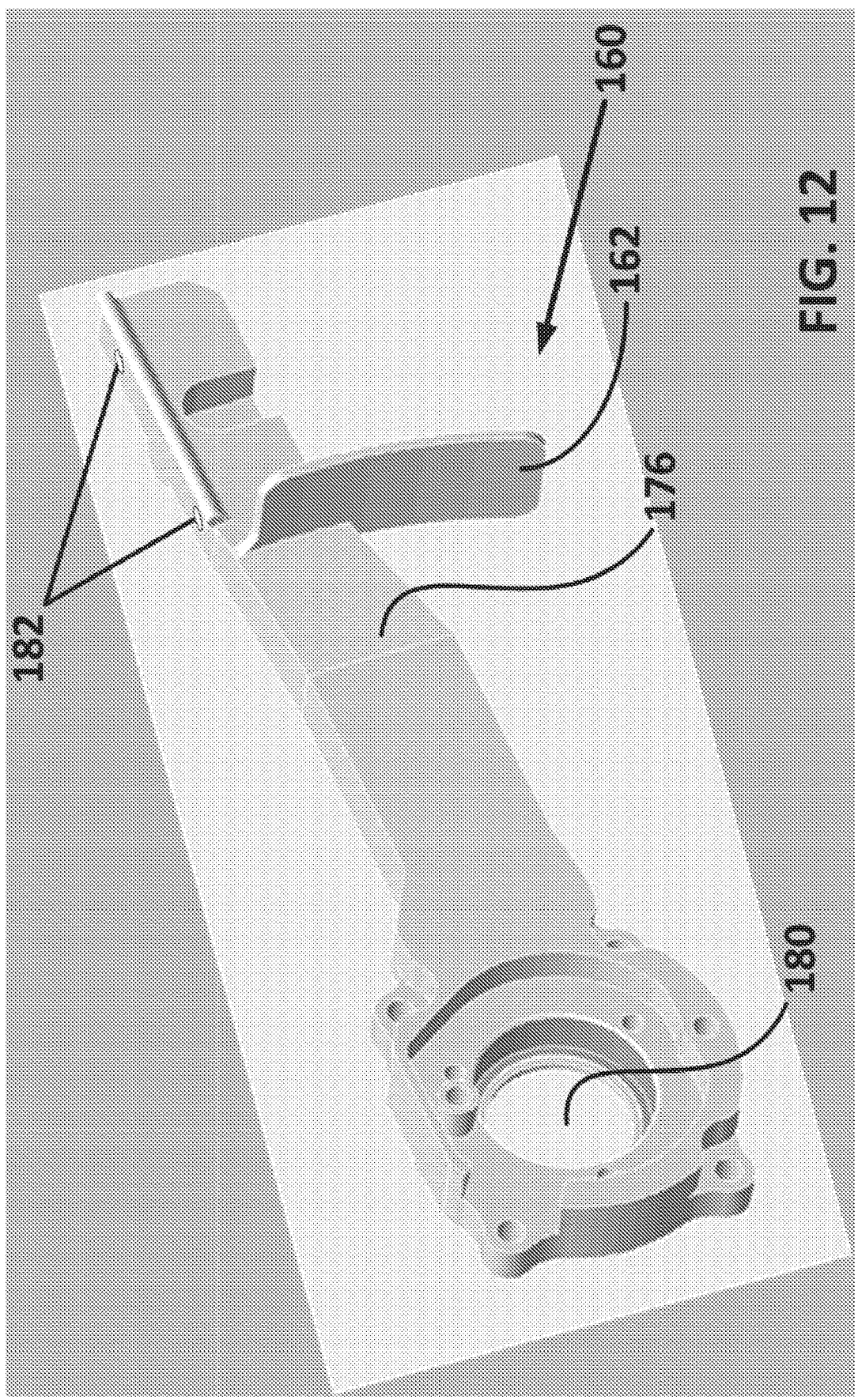
FIG. 12 is a perspective view of the arm of FIG. 11 shown in isolation, according to an example embodiment of the present invention.

FIGS. 11 and 12 illustrate an example embodiment of the blade size limiter 160 integrated with the arbor attachment assembly 158. In the illustrated embodiment, the arbor attachment assembly 158 includes a shaft 170 configured to be spun by the motor 101 (shown in FIG. 1). A pair of washers 172a-b, positioned near an end of the shaft 170, are configured to trap or sandwich a blade (not shown) between them as a nut 174 is tightened via threads to secure the blade to the table saw. In the illustrated example embodiment, the blade size limiter 160 is integrated into an arm 176 that is fixed to the saw arbor attachment assembly 158, for example, by fasteners 178a-b. The arm 176 includes, at a first end, a bore 180 configured to slide over the shaft 170 of the arbor attachment assembly 158, in the illustrated example embodiment, includes fasteners 178a-b to then fix the arm 176 to the arbor attachment assembly 158 so that the arm 176 remains stationary as the shaft 170 spins about axis A. The arm includes, at a second end, a mounting structure 182 that allows the riving knife position adjustment mechanism 146 to be attached thereto via fasteners 186, which in turn, holds the riving knife 110, onto which the pawls 114 (not shown) and the blade guard 112 (not shown) are attached. The extension portion 162 of the blade size limiter 160 is formed as an arcuate segment, is located between the first and second ends of the arm 176, and extends downwards away from the mounting structure 182.

As is apparent from the illustration, the arm 176 remains fixed relative to spin axis A as does the riving knife position adjustment mechanism 146. However, the safety components may otherwise be moved as needed or desired, as described above. The dimensioning of the parts of the safety components and their specific slots, holes, etc. in conjunction with the strategic placement of the extension portion 162 of the limiter 160 from the spin axis A dictate what size blade can be inserted onto the shaft 170 while at the same time helping to ensure that no safety component or other component of the table saw may be hit by a blade that has too great a radius. The arm 176 can be provided originally with a table saw as sold in the marketplace or it can be provided in the aftermarket as a replacement part or a retrofit for an existing table saw that was previously sold.

Figure 13:
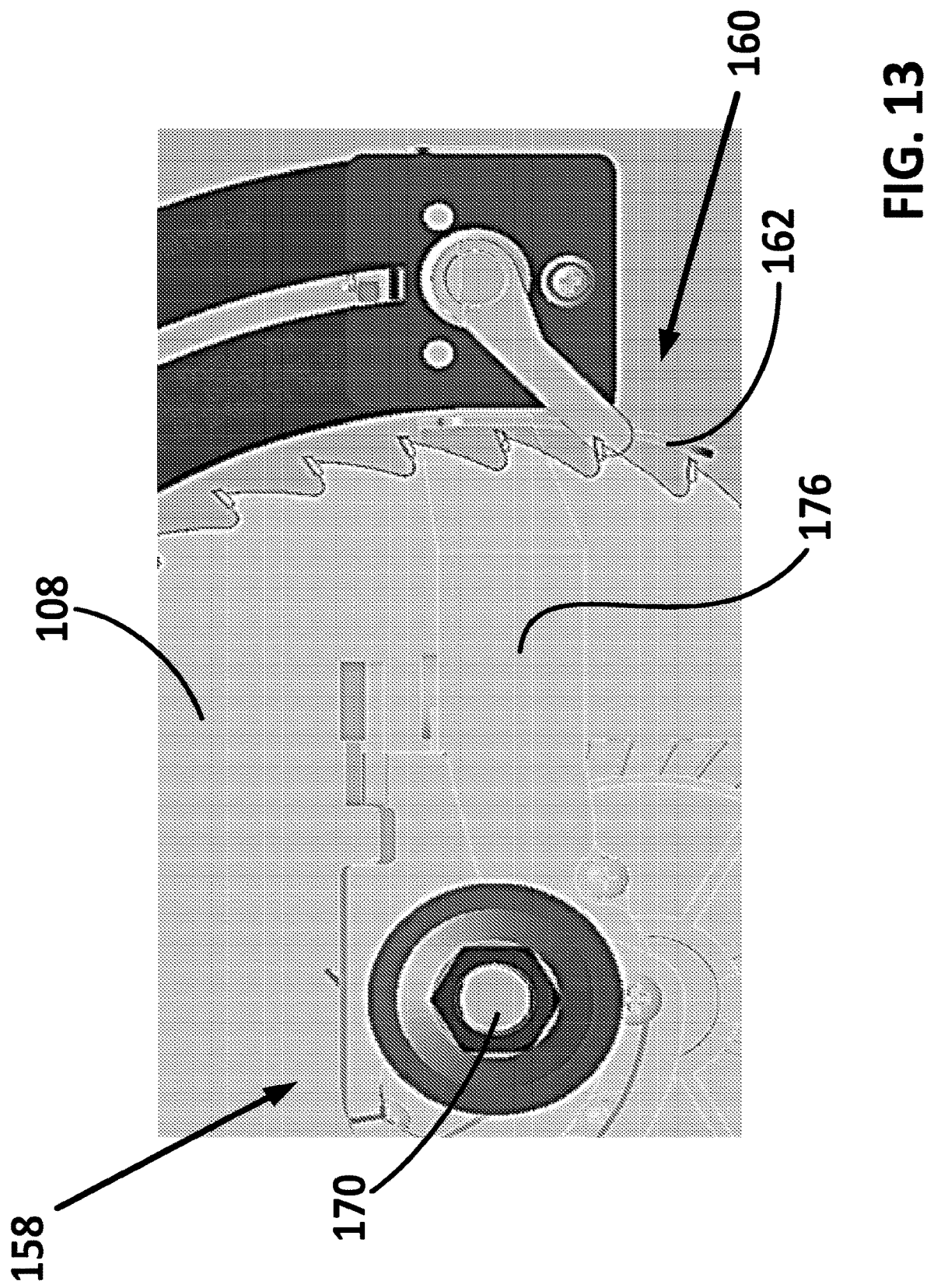
FIG. 13 is a close up side view, according to an example embodiment of the present invention, showing an instance of a go situation, where the saw blade is small enough to be installed onto the saw arbor attachment assembly, as there is no interference between the blade size limiter and the saw blade.
Figure 15:
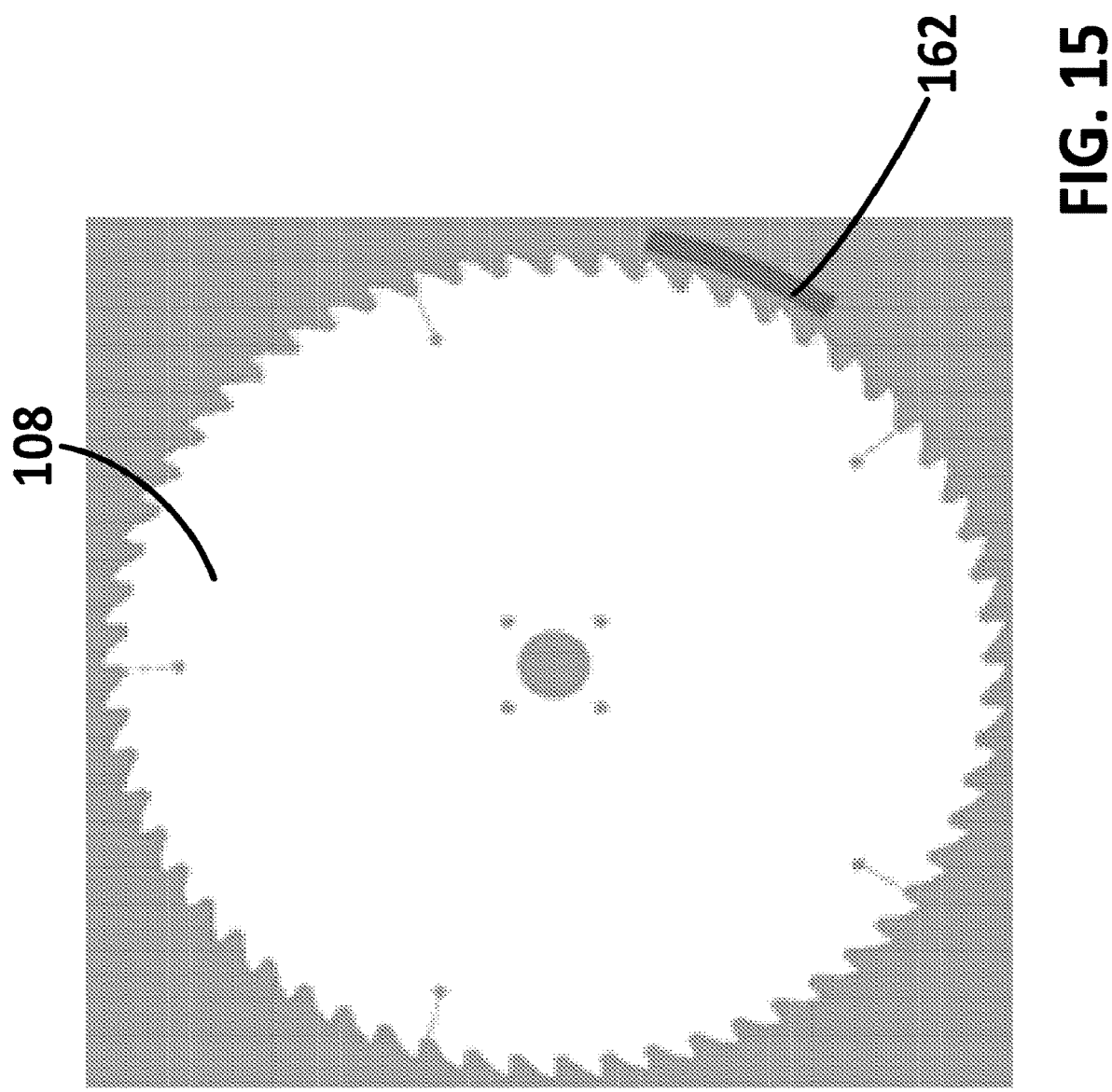
FIG. 15 is a simplified side view of the go situation of FIG. 13.

FIGS. 13 and 15 illustrate examples of a go situation where the blade 108 does not interfere with the extension portion 162 of the blade size limiter 160, so that the blade 108 can be successfully installed onto the shaft 170 of the arbor attachment assembly 158.

Figure 14:
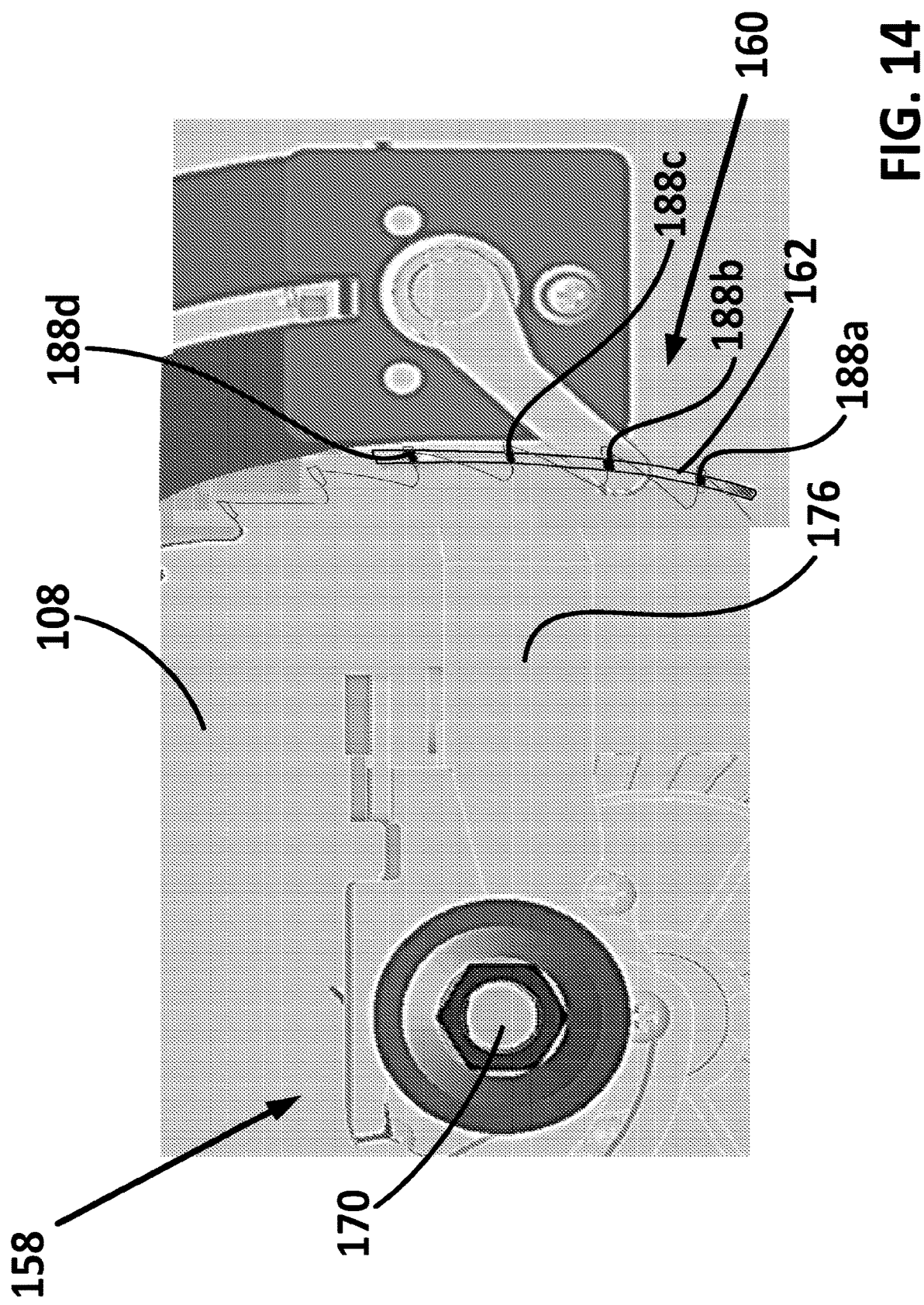
FIG. 14 is a close up side view, according to an example embodiment of the present invention, showing an instance of a no-go situation, where the saw blade is too big to be installed onto the saw arbor attachment assembly, as there is interference between the blade size limiter and the saw blade.
Figure 16:
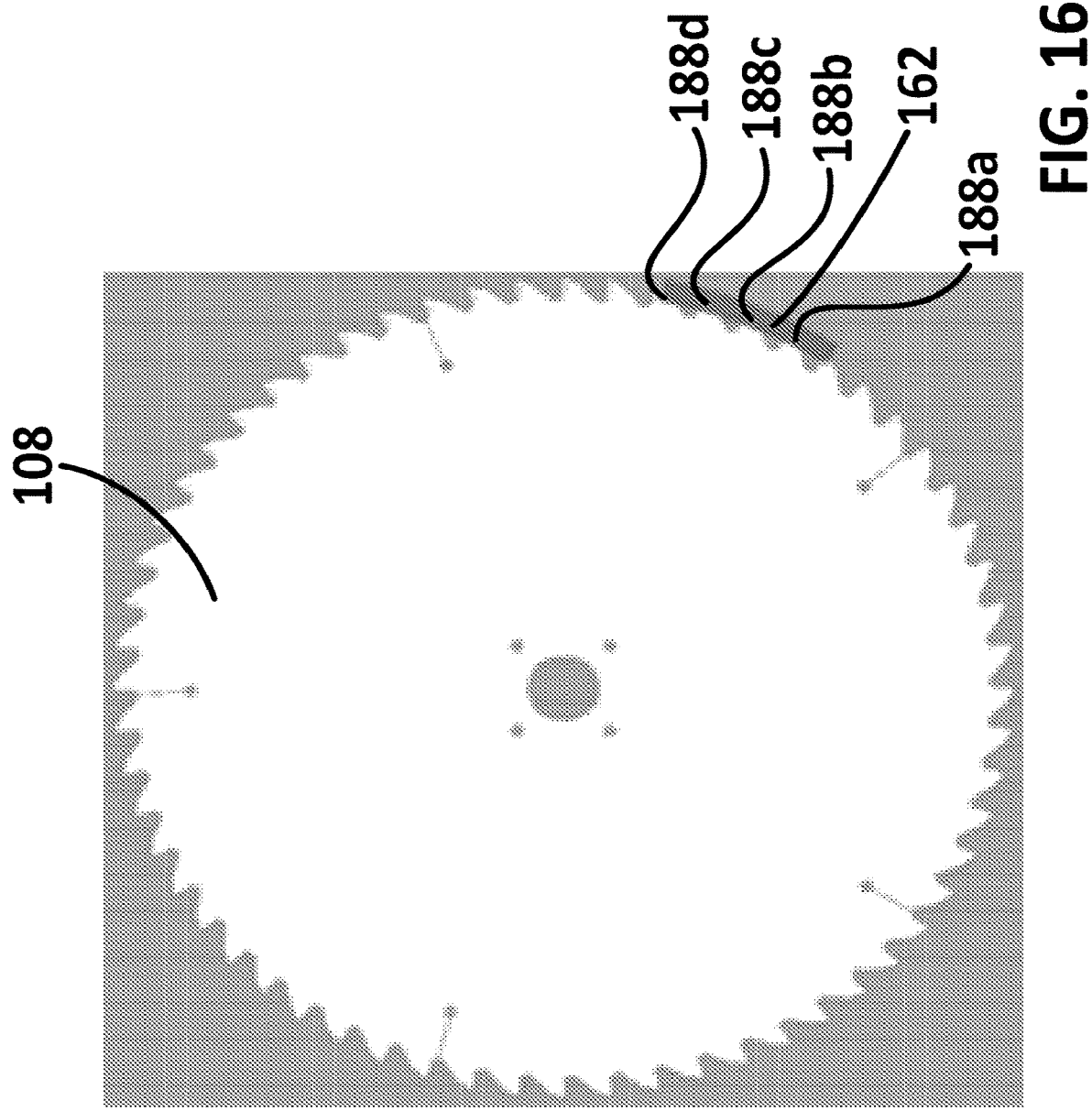
FIG. 16 is a simplified side view of the no-go situation of FIG. 14.

On the other hand, FIGS. 14 and 16 illustrate examples of a no-go situation where the radius of the blade is too large, creating points of interference 188a-d with the extension portion 162 of the blade size limiter 160, preventing installation of the blade.

FIG. 17 shows a variety of example profiles of the extension portion 162 of the blade size limiter 160. The arcuate segment can be continuous or split up into a few or many smaller segments, e.g., the segments can be formed of very small posts. The extension portion 162 does not need to have an arcuate segment but can be configured in any desired manner that will, with positioning of the limiter 160 relative to the shaft 170, typically cause interference with a radial extremity of a blade whose radius is too large. In an example embodiment, the extension portion includes at least one segment that spans a distance larger than that between two blade teeth of a typical blade, so that if the blade with the too large diameter is attempted to be installed, the segment would interfere with at least two of the teeth.

Figure 18:
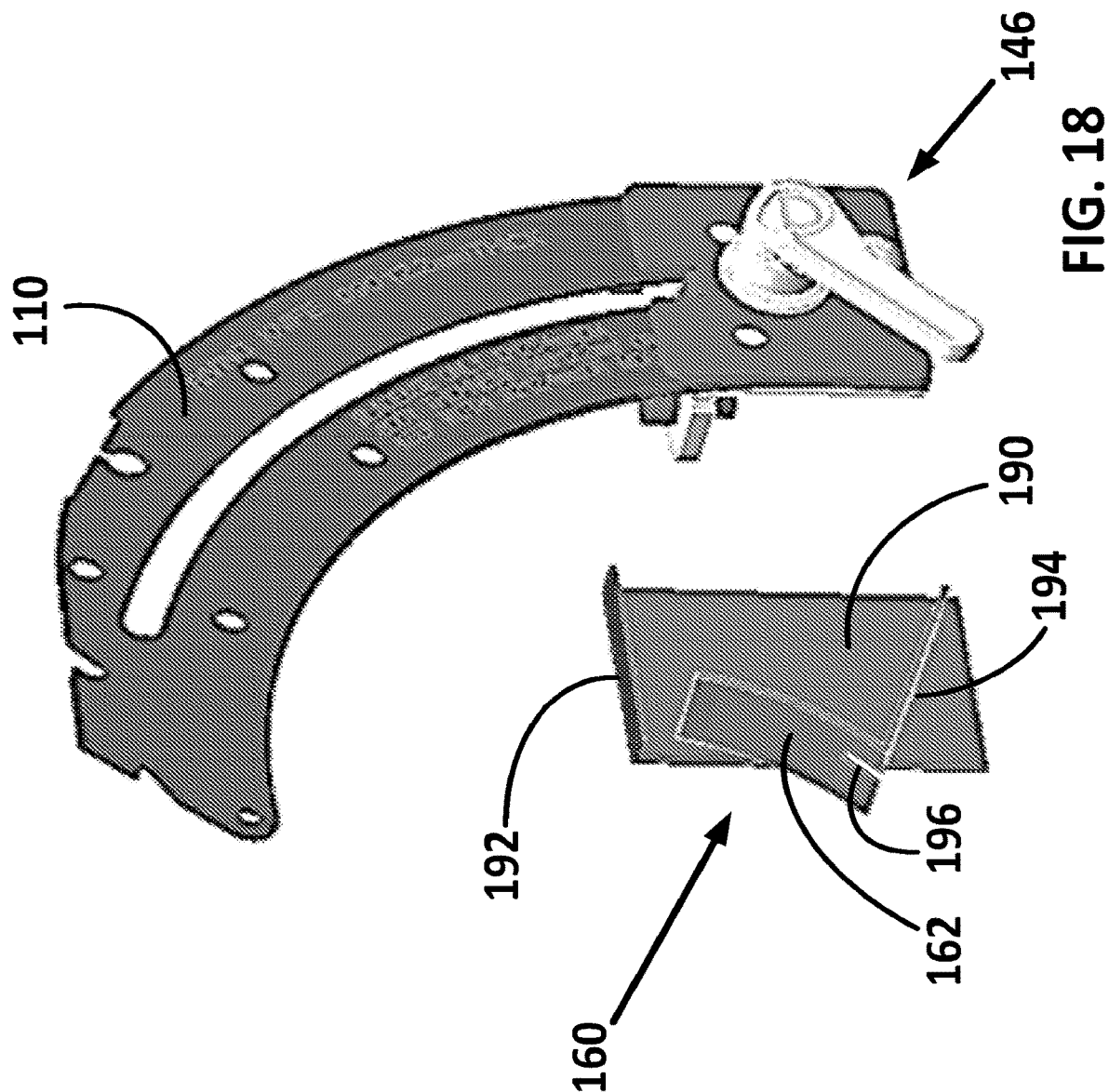
FIG. 18 is a perspective view of the blade size limiter side by side with a riving knife and its position adjustment mechanism before the limiter has been attached to the riving knife position adjustment mechanism, according to an example embodiment of the present invention.
Figure 19:
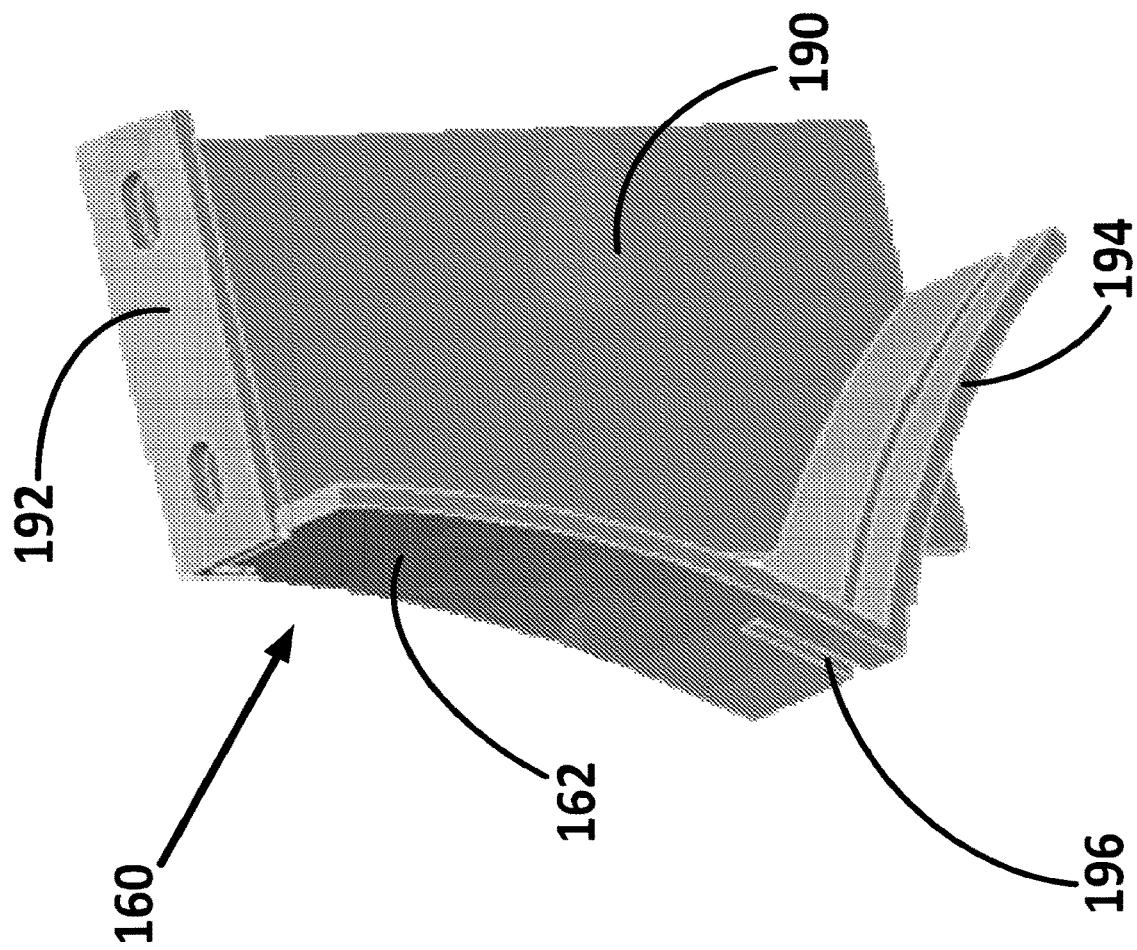
FIG. 19 is a close up perspective view of the blade size limiter of FIG. 18, according to an example embodiment of the present invention.

FIGS. 18 and 19 show another example embodiment of a blade size limiter 160 that can be economically manufactured using a stamping and forming process, making it ideal for retrofitting existing table saws that have already been sold, although it could also be part of an original sale of the table saw as well. The blade size limiter 160 includes a main body portion 190, a mounting structure 192 attached to the main body portion 190 at or proximate to a top edge of the main body 190, an extension portion 162 as previously described located at or proximate to a left extremity of the main body 190, and a fin 194 that extends to the right from the bottom of the extension portion 162.

The main body portion 190 acts as a guard to cover an opening in an undercarriage (not shown) of the table saw. Accordingly, in an example embodiment, its profile is rectangular to match the profile of the opening. The mounting structure 192 includes a flange with elongated mounting holes that are configured to allow some lateral movement of the blade size limiter 160 (due to their elongated shape). The flange is attachable to the underside of an arm using fasteners (not shown) such that it would be located under the riving knife position adjustment mechanism 146. Finally, the fin 194 can have a curved shape and act to direct air flow toward a dust port 198 (shown in FIGS. 7 and 8) in an effort to reduce any buildup on the extension portion 162. A slit 196 extends through the complete length of the fin 194 and partially into the extension portion 162 to accommodate the riving knife 110 therein when the riving knife is rotated down into its lowest position.

It is contemplated that various embodiments of the blade size limiter 160 can include an extension portion 162 that includes an arcuate segment and a mounting structure 182, 192 that is spaced a predetermined distance away from the extension portion 162.

While most of the described embodiments have been discussed herein with respect to table saws, it is contemplated that other tools that include a blade, e.g., other types of power tools, can use the blade size limiter. Consequently, these embodiments are also part of the present invention.

For any method or protocol discussed herein, any step may be omitted, substituted by other steps, or broken into sub-steps; and a described sequence of steps can be performed in an order that is different than has been specifically mentioned or may be performed simultaneously instead. Also, additional steps may be added.

The specific embodiments described above have been shown by way of example and may be susceptible to various modifications and alternative forms. For example, the above disclosed embodiments and other features, functions, aspects, or alternatives thereof, can be desirably combined into many other different systems, applications, or methods. Various presently unforeseen or unanticipated alternatives, modifications, variations, or improvements may be subsequently made by those skilled in the art that are also intended to be encompassed by the present invention. Furthermore, other features and aspects, etc. of certain embodiments can be substituted for or added to other features and aspects, etc. of other embodiments to produce yet further embodiments and are therefore contemplated to be within the scope of the present invention. The claims are therefore not intended to be limited to the particular described example forms, but rather to cover all modifications, equivalents, and alternatives falling with the sprit and scope of this disclosure.

What is claimed is:

1. A power tool comprising:
   a riving knife;
   an arbor attachment mechanism that includes a shaft that is configured to be driven to spin about a spin axis; and
   a blade size limiter that includes a limiting surface;
   wherein the limiting surface:
   (a) is connected or connectible to the arbor attachment mechanism so that the limiting surface is at a distance from the spin axis;
   (b) is configured to prevent a blade with a radius greater than a predetermined size to be mounted onto the shaft of the arbor attachment mechanism; and
   (c) faces the spin axis and is arranged such that, when a blade with a radius that is not greater than the predetermined size is mounted on the shaft, the limiting surface is positioned, with respect to a radial direction extending from the shaft, at a radial coordinate that is between a radial coordinate of a radially exterior edge of the blade and a radial coordinate of a most radially interior edge of the riving knife; and
   wherein:
   (1) the riving knife includes an arcuate edge that extends arcuately about the spin axis and the limiting surface of the blade size limiter extends arcuately about the spin axis; and/or
   (2) the power tool further comprises an arm, a first end of the arm is configured to surround the shaft, a second end of the arm is configured to be attached to the riving knife, the blade size limiter is attachable to the arm, and the limiting surface is concave and faces the shaft.

2. The power tool of claim 1, wherein the blade size limiter comprises the arm, the first end of the arm is configured to surround the shaft, and the second end of the arm is configured to be attached to the riving knife.

3. The power tool of claim 2, wherein the arm includes a mounting structure on the second end and a bore at the first end, and, with respect to a direction between the first and second ends, the limiting surface is positioned between the mounting structure and the bore.

4. The power tool of claim 1, wherein the power tool further comprises the arm, the first end of the arm is configured to surround the shaft, the second end of the arm is configured to be attached to the riving knife, the blade size limiter is attachable to the arm, and the limiting surface is concave and faces the shaft.

5. The power tool of claim 1, wherein the prevention of the mounting is by an interference between the limiting surface and an extremity of the blade with the radius greater than the predetermined size.

6. The power tool of claim 5, wherein the limiting surface extends in a direction parallel to a direction in which the spin axis extends.

7. The power tool of claim 6, wherein the limiting surface of the blade size limiter forms an arcuate segment.

8. The power tool of claim 1, wherein the power tool further comprises a table that includes a working surface and the blade size limiter is positioned below the working surface.

9. The power tool of claim 1, further comprising a motor, wherein the shaft of the arbor attachment mechanism is configured to be driven to spin about the spin axis by the motor.

10. A riving knife assembly comprising: a riving knife that includes an arcuate edge that extends arcuately about an axis; and
    a blade size limiter that includes:
    an arcuate segment; and
    a mounting structure configured to be attached to the riving knife, thereby positioning the arcuate segment of the blade size limiter to extend arcuately about the axis and, with respect to a radial direction extending from the axis, at a radial coordinate that is between a radial coordinate of a radially exterior edge of the blade and a radial coordinate of a most radially interior edge of the riving knife.

11. The riving knife assembly of claim 10, wherein, with respect to a direction from the mounting structure to a bore of the blade size limiter, the arcuate segment is located between the bore and the mounting structure.

12. The riving knife assembly of claim 11, wherein the arcuate segment extends arcuately about a central longitudinal axis of the bore.

13. The riving knife assembly of claim 10, wherein the blade size limiter is configured to be mounted relative to a table of a table saw such that at least a portion of the arcuate segment is below the mounting structure.

14. The riving knife assembly of claim 13, wherein the blade size limiter further comprises a fin that is attached to the arcuate segment.

15. The riving knife assembly of claim 14, wherein the fin is curved.

16. The riving knife assembly of claim 14, wherein the fin includes at least a portion of a slit.

17. The riving knife assembly of claim 16, wherein the slit extends into a portion of the arcuate segment.

18. The apparatus of claim 10, wherein:
    the blade size limiter further comprises a body;
    the mounting structure extends along and is attached to a top-most edge of the body, the top-most edge of the body extending parallel to the radial direction;
    the mounting structure extends away from the top-most edge of the body in a direction that is perpendicular to a direction of extension of a side face of the body, the side face of the body extending in a first face-extension direction that is parallel to the radial direction and extending away from the top-most edge of the body in a second face-extension direction; and
    the arcuate segment extends laterally from a side face of the body.

19. The apparatus of claim 18, wherein the mounting structure is configured to be attached to the riving knife via two elongated holes in the mounting structure.

20. The apparatus of claim 18, wherein the body is rectangular.

21. A tool comprising:
    a blade attachment mechanism including a shaft and configured for attachment of a blade that is not greater than a predetermined size to spin about the shaft;
    a riving knife;
    a position adjusting mechanism for adjusting a position of the riving knife relative to the shaft; and
    a blade size limiter that is attached to the position adjusting mechanism and includes a limiting surface that:
    (a) in a radial direction, faces a central longitudinal axis of the shaft; and
    (b) extends parallel to the central longitudinal axis of the shaft;
    wherein a radius from the shaft to the limiting surface is shorter than a radius from the shaft to a most radially interior coordinate of the riving knife and wherein the limiting surface is configured to prevent a blade with a radius greater than the predetermined size to be mounted onto the shaft; and wherein:
(1) the riving knife includes an arcuate edge that extends arcuately about a spin axis of the shaft and the limiting surface of the blade size limiter extends arcuately about the spin axis; and/or
(2) the power tool further comprises an arm, a first end of the arm is configured to surround the shaft, a second end of the arm is configured to be attached to the riving knife, the blade size limiter is attachable to the arm, and the limiting surface is concave and faces the shaft.

22. The tool of claim 21, wherein the prevention is by interference of the limiting surface with a radial extremity of the blade that has the radius greater than the predetermined size.

23. The power tool of claim 2, wherein the riving knife includes an arcuate edge that extends arcuately about the spin axis and the limiting surface of the blade size limiter extends arcuately about the spin axis.

24. The power tool of claim 2, wherein the shaft includes a threaded portion at which the blade with the radius that is not greater than the predetermined size is attachable and an extremity of which is at a first position along the spin axis, and the limiting surface extends parallel to the spin axis from at least (i) a position that is parallel to an axial position of the blade with the radius that is not greater than the predetermined size when the blade with the radius that is not greater than the predetermined size is attached to the shaft to (ii) a position that is parallel to the first position, and (iii) continuing on to a position that is parallel to a second position along the spin axis to which the threaded portion does not extend.

25. The power tool of claim 2, wherein:
the blade size limiter further includes:
    a connecting flange; and
    a main body surface:
        that extends perpendicularly to the shaft;
        that is integrally formed with the limiting surface and the connecting flange; and
        perpendicularly from which the limiting surface and the connecting flange extend;
the limiting surface faces the shaft; and
a position of the blade size limiter relative to the shaft is fixable via the connecting flange.

* * * * *